(12) United States Patent
Tokunou

(10) Patent No.: US 7,451,850 B2
(45) Date of Patent: Nov. 18, 2008

(54) DRIVE CONTROL APPARATUS AND METHOD FOR VEHICLES

(75) Inventor: Hidemichi Tokunou, Tokyo (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 589 days.

(21) Appl. No.: 11/155,777

(22) Filed: Jun. 20, 2005

(65) Prior Publication Data

US 2005/0284684 A1    Dec. 29, 2005

(30) Foreign Application Priority Data

Jun. 24, 2004    (JP)    ............... 2004-186326

(51) Int. Cl.
*B60K 17/356*    (2006.01)

(52) U.S. Cl. .................................... 180/242

(58) Field of Classification Search ............ 477/3, 477/5, 181; 180/197, 233, 242, 54.1, 65.2
See application file for complete search history.

(56) References Cited

U.S. PATENT DOCUMENTS

| | | | |
|---|---|---|---|
| 5,903,113 A * | 5/1999 | Yamada et al. ............ | 318/10 |
| 6,109,237 A | 8/2000 | Pels et al. | |
| 6,434,469 B1 * | 8/2002 | Shimizu et al. ............ | 701/84 |
| 6,953,415 B2 * | 10/2005 | Kadota ............... | 477/5 |
| 7,004,018 B2 * | 2/2006 | Kadota et al. ............ | 73/115.02 |
| 7,140,460 B2 * | 11/2006 | Shimizu et al. ............ | 180/65.2 |
| 7,234,553 B2 * | 6/2007 | Shimizu et al. ............ | 180/65.2 |
| 2002/0013194 A1 * | 1/2002 | Kitano et al. ............ | 477/3 |

FOREIGN PATENT DOCUMENTS

| | | |
|---|---|---|
| EP | 1 142 743 A2 | 10/2001 |
| EP | 1 326 083 A1 | 7/2003 |
| JP | 2002-200932 A | 7/2002 |

* cited by examiner

*Primary Examiner*—Lesley D. Morris
*Assistant Examiner*—Daniel Yeagley
(74) *Attorney, Agent, or Firm*—Foley & Lardner LLP

(57) ABSTRACT

A drive control apparatus and method for a vehicle having an internal combustion engine driving main drive wheels, an electric motor driving auxiliary drive wheels, and a clutch disposed between the electric motor and the auxiliary drive wheels. The drive control apparatus includes a drag motion detection section configured to detect that the electric motor undergoes a drag motion due to idle torque of the clutch, and a reverse torque control section configured to control torque of the electric motor in a direction reverse to a direction of the drag motion of the electric motor when the drag motion of the electric motor is detected by the drag motion detection section.

23 Claims, 5 Drawing Sheets

DRIVE CONTROL APPARATUS AND METHOD FOR VEHICLES

BACKGROUND OF THE INVENTION

The present invention relates to a drive control apparatus and method for vehicles having main drive wheels driven by an internal combustion engine and auxiliary wheels driven by an electric motor in which a clutch is disposed between the electric motor and the auxiliary wheels.

Japanese Patent Application First Publication No. 2002-200932 shows a driving force control apparatus for four-wheel-drive vehicles in which front wheels are driven by an engine and rear wheels are driven by an electric motor, i.e., in so-called four-wheel-drive vehicles of a stand-by type, a clutch is intervened between the electric motor and the wheels and operative to interrupt a power transmission therebetween when the electric motor is not operated, whereby friction loss therein is maintained at a low level and deterioration in fuel economy thereof is prevented.

SUMMARY OF THE INVENTION

However, in wet clutches, if the wheels as driven members are rotated even though the clutch is in a disengaged state, idle torque (also referred to as drag torque) is produced therein owing to viscosity of oil used therein so that the electric motor as a drive member tends to cause a follow-up motion. Although the idle torque is slight, a speed reducer intervened between the clutch and the electric motor tends to cause excessive rotation of the electric motor. The electric motor may be prevented from undergoing such a drag motion to cause excessive rotation by increasing a rotational resistance (friction) thereof. However, this leads to limitations in type and structure of the electric motor used, resulting in deterioration of cost performance and operating efficiency thereof.

It is an object of the present invention to provide a vehicular drive control apparatus capable of effectively preventing an electric motor from undergoing a drag motion even when idle torque is caused in a clutch interposed between the electric motor and wheels, thereby serving for using an electric motor with a low rotational resistance.

In one aspect of the present invention, there is provided a drive control apparatus for a vehicle having an internal combustion engine driving main drive wheels, an electric motor driving auxiliary drive wheels, and a clutch disposed between the electric motor and the auxiliary drive wheels, the drive control apparatus comprising:

a drag motion detection section configured to detect that the electric motor undergoes a drag motion due to idle torque of the clutch; and a reverse torque control section configured to control torque of the electric motor in a direction reverse to a direction of the drag motion of the electric motor when the drag motion of the electric motor is detected by the drag motion detection section.

In a further aspect of the present invention, there is provided a drive control apparatus for a vehicle having an internal combustion engine driving main drive wheels, an electric motor driving auxiliary drive wheels, and a clutch disposed between the electric motor and the auxiliary drive wheels, the drive control apparatus comprising:

a drag motion detection means for detecting that the electric motor undergoes a drag motion due to idle torque of the clutch; and a reverse torque control means for controlling torque of the electric motor in a direction reverse to a direction of the drag motion of the electric motor when the drag motion of the electric motor is detected by the drag motion detection means.

In a still further aspect of the present invention, there is provided a method for controlling a vehicle having an internal combustion engine driving main drive wheels, an electric motor driving auxiliary drive wheels, and a clutch disposed between the electric motor and the auxiliary drive wheels, the method comprising:

detecting that the electric motor undergoes a drag motion due to idle torque of the clutch; and controlling torque of the electric motor in a direction reverse to a direction of the drag motion of the electric motor when the drag motion of the electric motor is detected.

DETAILED DESCRIPTION OF THE INVENTION

Figure 1:
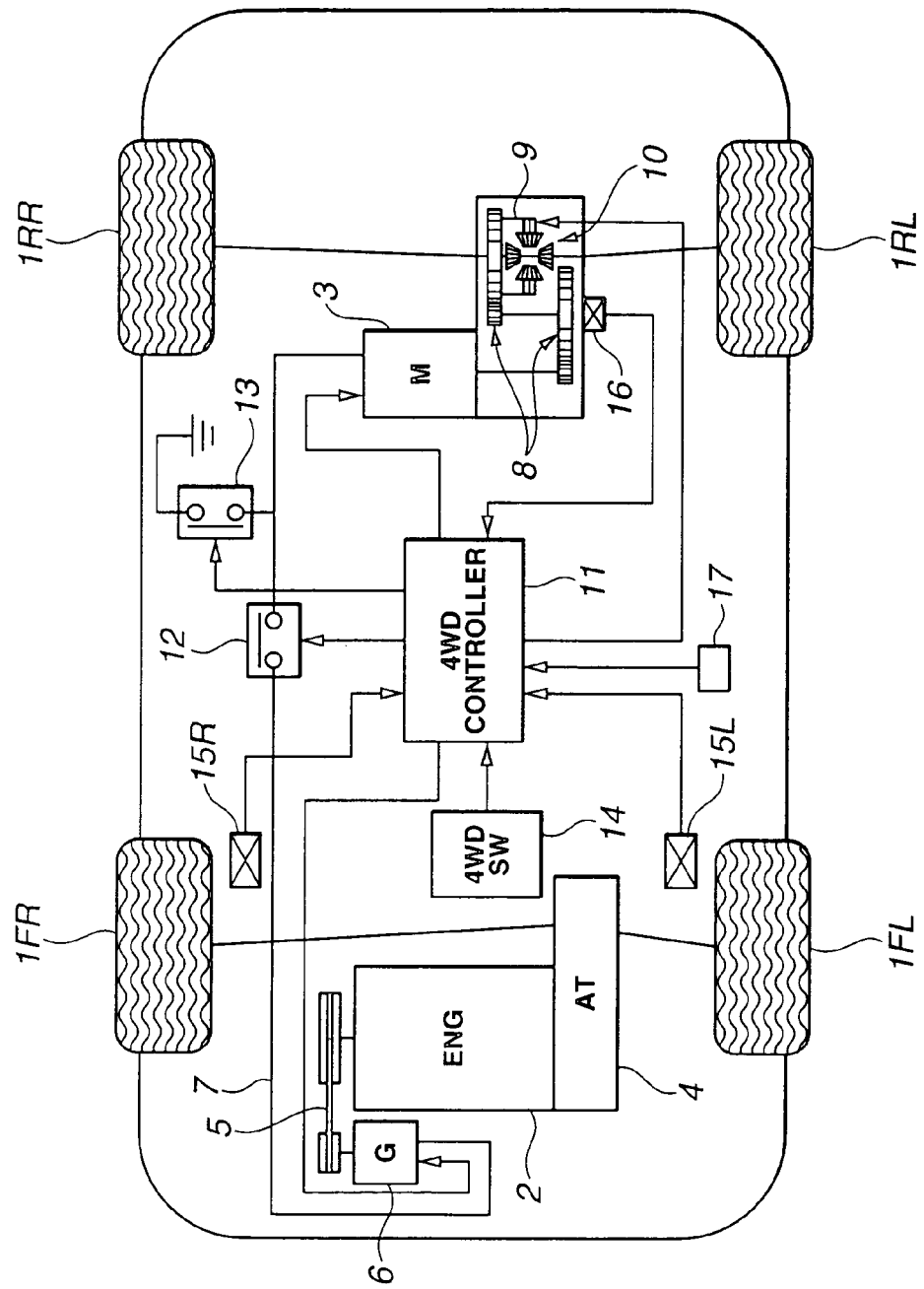
FIG. 1 is a schematic diagram illustrating a four-wheel-drive vehicle to which a drive control apparatus according to the present invention is applied.

Referring to FIG. 1, there is shown a schematic view of a four-wheel-drive vehicle of a so-called stand-by type, to which a drive control apparatus according to a first embodiment of the present invention is incorporated. As shown in FIG. 1, front wheels 1FL and 1FR constitute main drive wheels driven by engine 2, i.e., internal combustion engine, and rear wheels 1RL and 1RR constitute auxiliary drive wheels driven by electric motor 3. Clutch 9 is disposed between electric motor 3 and rear wheels 1RL and 1RR.

An output power of engine 2 is transmitted through automatic transaxle 4 with a torque converter to front wheels 1FL and 1FR, and simultaneously through V belt 5 to generator 6. Generator 6 is operated by engine 2, and generates an electric power which is directly supplied to electric motor 3 through power cable 7. On the other hand, an output power of electric motor 3 is transmitted sequentially through two-stage speed reducer 8, electromagnetically operated wet-multiple disc clutch 9 and differential gear 10 to rear wheels 1RL and 1RR.

Generator 6 is equipped with a transistor-actuated regulator for controlling generated voltage V of generator 6. Specifically, the regulator controls field current Ig in response to a generator control command transmitted from 4WD controller 11, thereby suitably controlling the generated voltage V of generator 6. In the course of power cable 7, there are disposed cut-off relay 12 for interrupting a power supply from generator 6 to electric motor 3, and short-circuit relay 13 for effecting short-circuit for an armature of electric motor 3. Both of the relays 12 and 13 are controlled in response to relay control command transmitted from 4WD controller 11.

Electric motor 3 is constituted of, for example, a direct current (DC) motor of a separately excited type. Electric motor 3 is electronically connected to 4WD controller 11 and receives a motor control command transmitted therefrom. Field current Im applied to electric motor 3 is controlled in response to the motor control command to thereby control drive torque Tm of electric motor 3. Clutch 9 is of an excited actuation type which is engaged when applying an exciting current thereto. Clutch 9 is electronically connected to 4WD controller 11 and receives a clutch control command transmitted therefrom. The exciting current is controlled in response to the clutch control command to thereby control torque transmission from electric motor 3 to rear wheels 1RL and 1RR.

4WD controller 11 receives ON/OFF signal of 4WD switch 14 actuated by a vehicle driver. 4WD controller 11 controls clutch 9 such that when OFF signal is input thereto, clutch 9 is disengaged to interrupt drive of rear wheels 1RL and 1RR by electric motor 3, namely, be in a two-wheel-drive condition, whereas when ON signal is input thereto, clutch 9 is engaged to thereby drive rear wheels 1RL and 1RR by electric motor 3, namely, be in a four-wheel-drive condition. In addition, 4WD controller 11 receives a signal indicative of front wheel speeds $V_{WFL}$ and $V_{WFR}$ detected by wheel rotation speed sensor 15L and 15R, respectively, rotation speed Nm of electric motor 3 detected by motor rotation speed sensor 16, and opening degree Acc of an accelerator which is detected by accelerator position sensor 17. 4WD controller 11 processes these signals and executes a reverse torque control at a drag motion detection section and a reverse torque control section, as explained in detail later. The drag motion detection section is configured to detect that electric motor 3 undergoes a drag motion due to idle torque of clutch 9. The reverse torque control section is configured to control a torque of electric motor 3 in a direction reverse to a direction of the drag motion of electric motor 3 when the drag motion of electric motor 3 is detected by the drag motion detection section. 4WD controller 11 may include one or more microcomputers each including a central processing unit (CPU), a read-only memory (ROM), a random access memory (RAM), and input/output interface (I/O interface).

Figure 2:
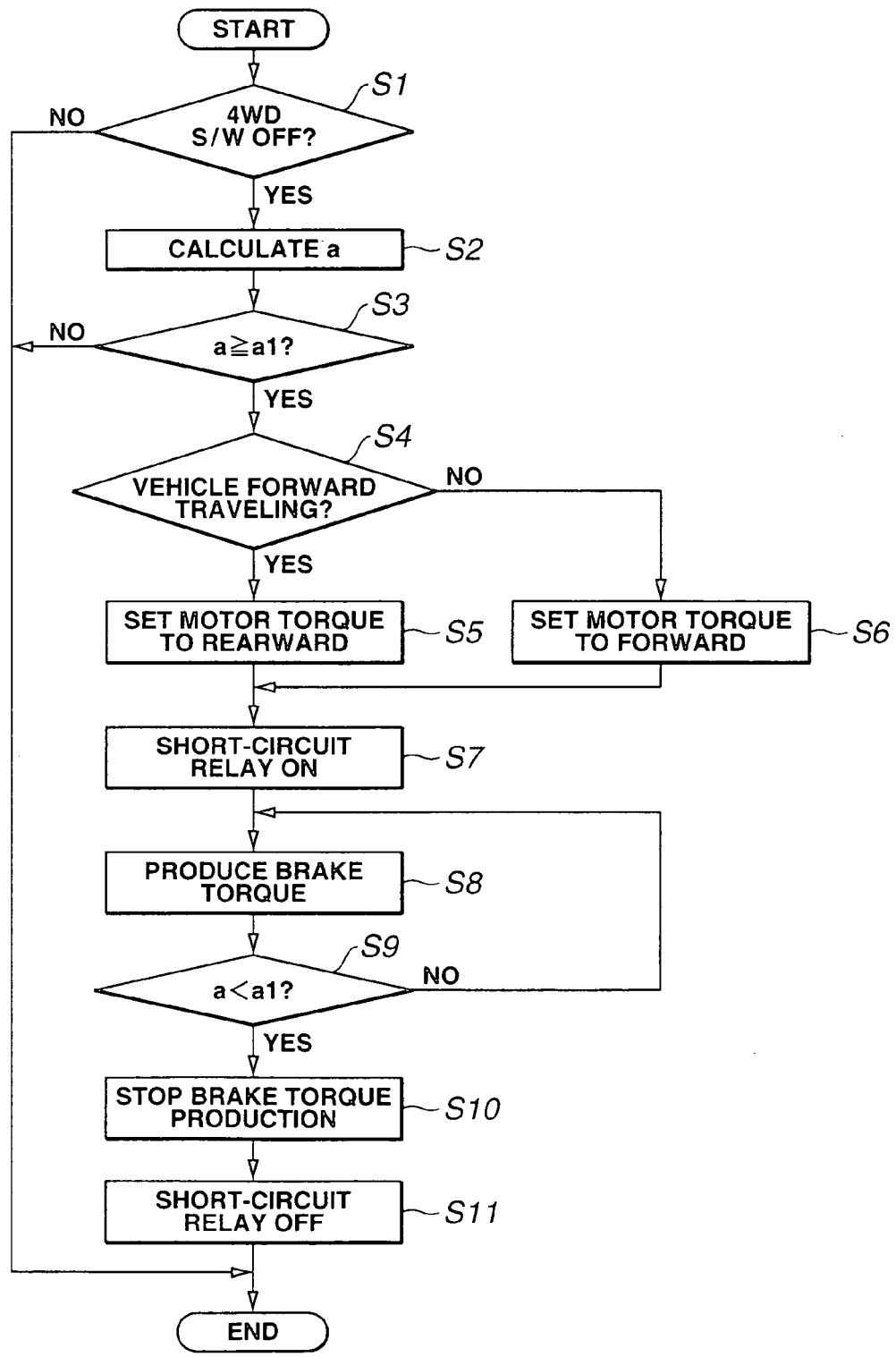
FIG. 2 is a flowchart of a reverse torque control routine implemented in a first embodiment of the drive control apparatus of the present invention.

Referring to FIG. 2, a flow of a reverse torque control routine implemented by 4WD controller 11 in the first embodiment is explained. Meanwhile, details of a control process upon four-wheel-drive operation are omitted here. The reverse torque control process is executed at predetermined time intervals, for example, every 10 msec.

As shown in FIG. 2, logic flow starts and goes to step S1 where 4WD controller 11 determines whether or not 4WD switch 14 is in OFF position. When the determination in step S1 is negative, that is, when 4WD switch 14 is in ON position, it is determined that the vehicle is in a four-wheel-drive operation condition. Then, the process is ended. When the determination in step S1 is affirmative, that is, when 4WD switch 14 is in OFF position, it is determined that the vehicle is in a two-wheel-drive operation condition. Then, 4WD controller 11 proceeds to step S2.

In step S2, 4WD controller 11 calculates motor rotation acceleration "a" on the basis of motor rotation speed Nm. Subsequently, in step S3, 4WD controller 11 determines whether or not motor rotation acceleration "a" is not less than predetermined value a1. In this embodiment, the predetermined value a1 is not less than twice a wheel rotation acceleration. The predetermined value a1 may be set to any times the wheel rotation acceleration as a tuning parameter. In step S3, when motor rotation acceleration "a" is less than predetermined value a1, it is determined that electric motor 3 is free from a drag motion due to idle torque, i.e., so-called drag torque, of clutch 9. Then, the process is ended. In step S3, when motor rotation acceleration "a" is predetermined value a1 or more, it is determined that electric motor 3 undergoes the drag motion due to idle torque of clutch 9, and then, 4WD controller 11 proceeds to step S4. Here, the idle torque means a torque that is produced by idling of the driven side part and transmitted to the drive side part when clutch 9 is in a disengaged state. In other words, the idle torque means a torque of the driven side part that tends to draw the drive side part.

In step S4, 4WD controller 11 determines whether the vehicle is traveling forward or rearward on the basis of front wheel speeds VWFL and VWFR. Namely, in step S4, 4WD controller 11 determines a direction of the drag motion of electric motor 3. In step S4, when the vehicle is forward traveling, it is determined that the drag motion of electric motor 3 is caused in the forward direction. Then, the process proceeds to step S5 where the motor torque to be produced in electric motor 3 is set in the rearward direction. In step S4, when the vehicle is rearward traveling, it is determined that the drag motion of electric motor 3 is caused in the rearward direction. Then, the process proceeds to step S6 where the motor torque to be produced in electric motor 3 is set in the forward direction.

In step S7 subsequent to step S5 or S6, short-circuit relay 13 is turned ON to short-circuit an armature of electric motor 3. In step S8, torque of electric motor 3 is controlled in a direction reverse to the direction of the drag motion of electric motor 3 by controlling field current and current direction of electric motor 3, to thereby produce brake torque in electric motor 3. Here, the brake torque to be produced is set to a minimum value capable of attenuating rotation acceleration "a" of the drag motion.

Subsequently, in step S9, 4WD controller 11 determines whether or not rotation acceleration "a" of electric motor 3 is dropped to less than predetermined value a1. In step S9, when rotation acceleration "a" of electric motor 3 is predetermined value a1 or more, it is determined that the drag motion of electric motor 3 still continues. Then, the process returns to step S8. In step S9, when rotation acceleration "a" of electric motor 3 is less than predetermined value a1, it is determined that electric motor 3 is free from the drag motion. Then, 4WD controller 11 proceeds to step S10 where the production of field current in electric motor 3 is stopped to thereby cease the production of brake torque therein.

Next, in step S11, short-circuit relay 13 is turned OFF to release the short-circuit of electric motor 3. Then, the process goes to END to terminate the reverse torque control process.

Steps S1 to S3 constitute the drag motion detection section of 4WD controller 11, and steps S4 to S11 constitute the reverse torque control section thereof.

The operation and effects of the first embodiment of the drive control apparatus of the present invention will be explained hereinafter. When the vehicle travels in a two-wheel-drive condition with 4WD switch 14 in OFF position as indicated "YES" in step S1, namely, when electric motor 3 is deenergized, clutch 9 is in a disengaged state so that friction loss can be kept less, and therefore, fuel economy can be prevented from being deteriorated.

However, when rear wheels 1RL and 1RR on the driven side are rotated, clutch 9 in the disengaged state undergoes idle torque generated due to viscosity of oil used in clutch 9. This causes a drag motion of electric motor 3 on the drive side. Although the idle torque is small, there is a possibility that electric motor 3 suffers from excessive drag rotation by two-stage speed reducer 8 interposed between clutch 9 and electric motor 3. The occurrence of drag rotation can be suppressed by the use of an electric motor having a large rotation resistance, namely, friction. This, however, leads to limitation in type and construction of the electric motor, thereby causing increase in cost and deterioration in motor efficiency.

In the first embodiment of the present invention, when the drag motion of electric motor 3 caused due to the idle torque of clutch 9 is detected, namely, when 4WD switch 14 is in OFF position and clutch 9 is in the disengaged state, as indicated at YES in step S1, and motor rotation acceleration "a" is predetermined value a1 or more as indicated at YES in step S3, short-circuit relay 13 is turned ON to short-circuit the armature of electric motor 3, and the field current and current direction in electric motor 3 are controlled to produce motor torque of electric motor 3 in a direction reverse to a direction of the drag motion to thereby produce brake torque in electric motor 3, as indicated in steps S4 to S8.

As explained above, the braking effect is exerted on electric motor 3 to prevent the drag motion thereof such as excessive rotation, so that an electric motor having a small rotation resistance can be used. Thus, limitation in type and construction of electric motor 3 can be reduced, thereby avoiding problems such as increase in cost and deterioration in motor efficiency.

Further, in the reverse torque control operation of the first embodiment, the brake torque is produced not during an entire period in which clutch 9 is in the disengaged state, but a minimum brake torque capable of attenuating rotation acceleration "a" of the drag motion of electric motor 3 is produced only for a period in which the drag motion of electric motor 3 continues. This can effectively suppress deterioration of fuel economy.

Further, in the reverse torque control operation of the first embodiment, when clutch 9 is in the disengaged state and rotation acceleration "a" of electric motor 3 is predetermined value a1 or more, it is determined that electric motor 3 undergoes the drag motion. This ensures facilitated detection of the drag motion of electric motor 3.

Further, the present invention is not limited to the first embodiment in which the wet-multiple disc clutch is used as clutch 9, and may be applied to a modification employing any type of clutches capable of producing idle torque therein, for instance, a powder clutch in which idle torque is produced due to residual magnetism of powder.

Further, the present invention is not limited to the first embodiment in which the DC motor is used as electric motor 3, and may be applied to a modification in which an alternating current (AC) motor is used. In this case, a switching device of an inverter may be controlled to produce motor torque of a value in a direction reverse to that of the drag motion of the AC motor.

Further, the present invention is not limited to the first embodiment in which when the drag motion of electric motor 3 is detected, the brake torque in the direction reverse to the direction of the drag motion is produced. Since the brake torque also acts as regenerative torque, the electric energy generated by the brake torque may be used for charging a battery to thereby enhance the energy efficiency.

Further, the present invention is not limited to the first embodiment in which the electric power generated by generator 6 is supplied to only electric motor 3. The present invention may be applied to a modification in which the electric power generated is supplied to electrical equipments such as a battery, an igniter, a starter and an air conditioner. Furthermore, the present invention is not limited to the first embodiment in which the changeover between the two-wheel-drive condition and the four-wheel-drive condition is performed only by 4WD switch 14. The present invention may be applied to a modification in which the changeover between the two-wheel-drive and four-wheel-drive conditions is carried out in response to a slip condition of front wheels 1FL and 1FR and an accelerator operation by the vehicle driver.

Further, the present invention is not limited to the first embodiment in which front wheels 1FL and 1FR serve as the main drive wheels driven by engine 2, and rear wheels 1RL and 1RR serve as the auxiliary drive wheels driven by electric motor 3. The present invention may be applied to a modification in which rear wheels 1RL and 1RR serve as the main drive wheels and front wheels 1FL and 1FR serve as the auxiliary drive wheels. Furthermore, the present invention is not limited to be the four-wheel vehicle as described in the first embodiment, and may be applied to a two-wheel vehicle, a three-wheel vehicle and a vehicle having five or more wheels.

Figure 3:
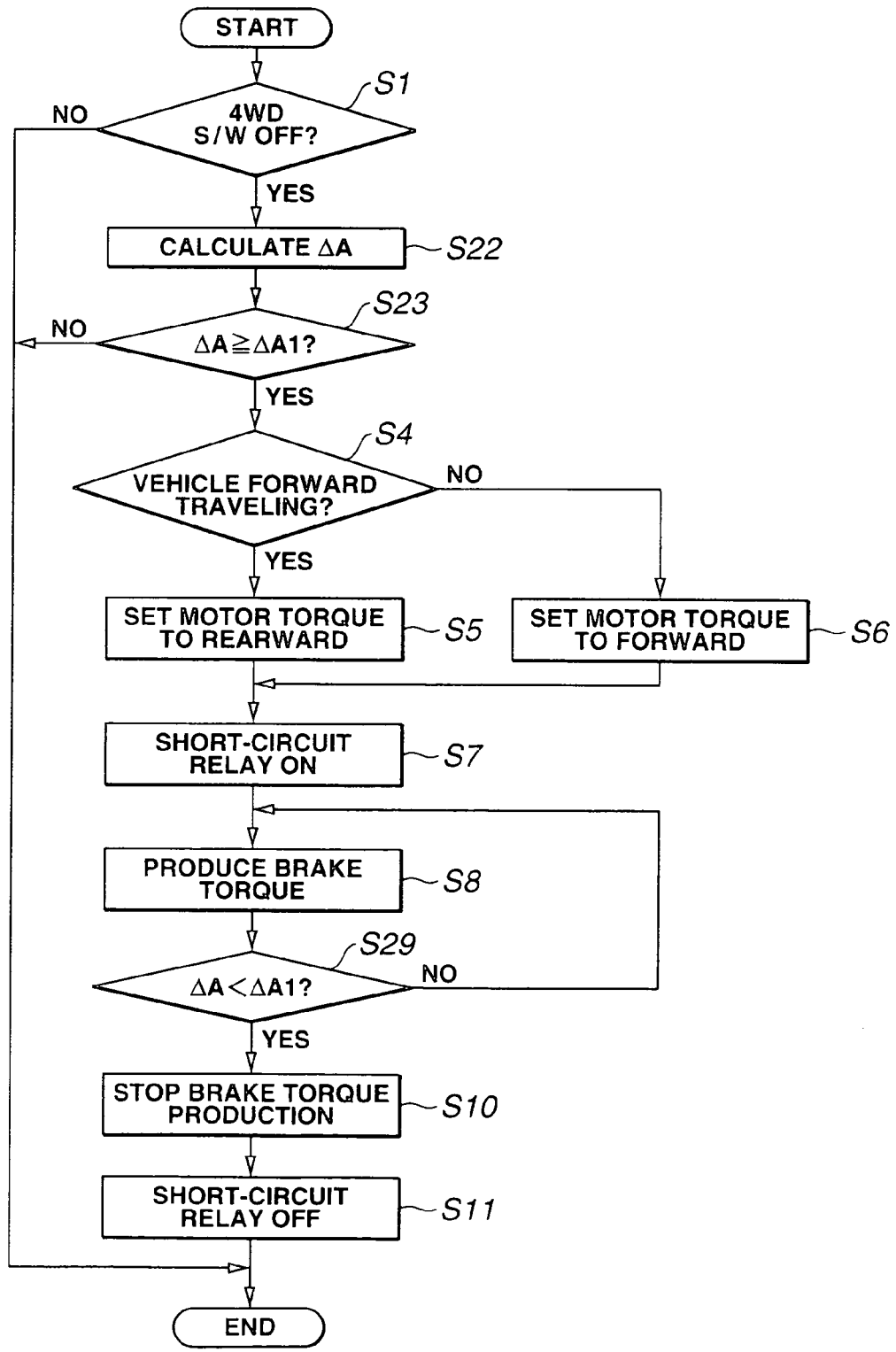
FIG. 3 is a flowchart of a reverse torque control routine implemented in a second embodiment of the drive control apparatus of the present invention.

Referring to FIG. 3, a flow of a reverse torque control routine implemented by 4WD controller 11 in a second embodiment of the present invention is explained. The second embodiment differs from the first embodiment in that 4WD controller 11 determines that electric motor 3 undergoes the drag motion when clutch 9 is in a disengaged state and increment $\Delta A$ in accelerator opening degree Acc is not less than predetermined value $\Delta A1$. Namely, the second embodiment is the same as the first embodiment except that steps S22, S23 and S29 as shown in FIG. 3 are used instead of steps S2, S3 and S9 as shown in FIG. 2 of the first embodiment. Like reference numerals denote like steps, and therefore, detailed explanations therefor are omitted.

As illustrated in FIG. 3, in step S22, 4WD controller 11 calculates increment $\Delta A$ in accelerator opening degree Acc on the basis of accelerator opening degree Acc. In step S23, 4WD controller 11 determines whether or not increment $\Delta A$ is not less than predetermined value $\Delta A1$. In this embodiment, the predetermined value $\Delta A1$ is a value capable of allowing engine 2 to generate a drive force which drives the wheels so as to accelerate the vehicle to 0.05 G or more. The predetermined value $\Delta A1$ may be set to any other value of G as a tuning parameter. In step S23, when increment $\Delta A$ is less than predetermined value $\Delta A1$, it is determined that electric motor 3 is free from the drag motion caused due to idle torque of clutch 9. Then, the process is ended. In step S23, when increment $\Delta A$ is predetermined value $\Delta A1$ or more, it is determined that electric motor 3 undergoes the drag motion caused due to idle torque of clutch 9, and then, the process proceeds to step S4. The reason for this determination is that rotation acceleration of electric motor 3 due to the drag motion is in proportional to rotation acceleration of rear wheels 1RL and 1RR, which is in proportional to accelerator opening degree Acc.

In step S29, 4WD controller 11 determines whether or not increment $\Delta A$ in accelerator opening degree Acc is dropped to less than predetermined value $\Delta A1$. In step S29, when increment $\Delta A$ is predetermined value $\Delta A1$ or more, it is determined that the drag motion of electric motor 3 still continues. Then, 4WD controller 11 returns to step S8. In step S29, when increment $\Delta A$ is less than predetermined value $\Delta A1$, it is determined that electric motor 3 is free from the drag motion. Then, the process proceeds to step S10. Steps S1, S22 and S23 constitute the drag motion detection section of 4WD controller 11, and steps S4 to S8, S29, S10 and S11 constitute the reverse torque control section thereof.

In the second embodiment as described above, the drag motion of electric motor 3 is detected on the basis of increment $\Delta A$ in accelerator opening degree Acc. Therefore, before rotation acceleration "a" and rotation speed Nm of electric motor 3 are actually increased, the brake torque in a direction reverse to a direction of the drag motion can be produced in electric motor 3 to thereby more effectively prevent the drag motion. The second embodiment can also attain the same effects as those of the first embodiment.

Figure 4:
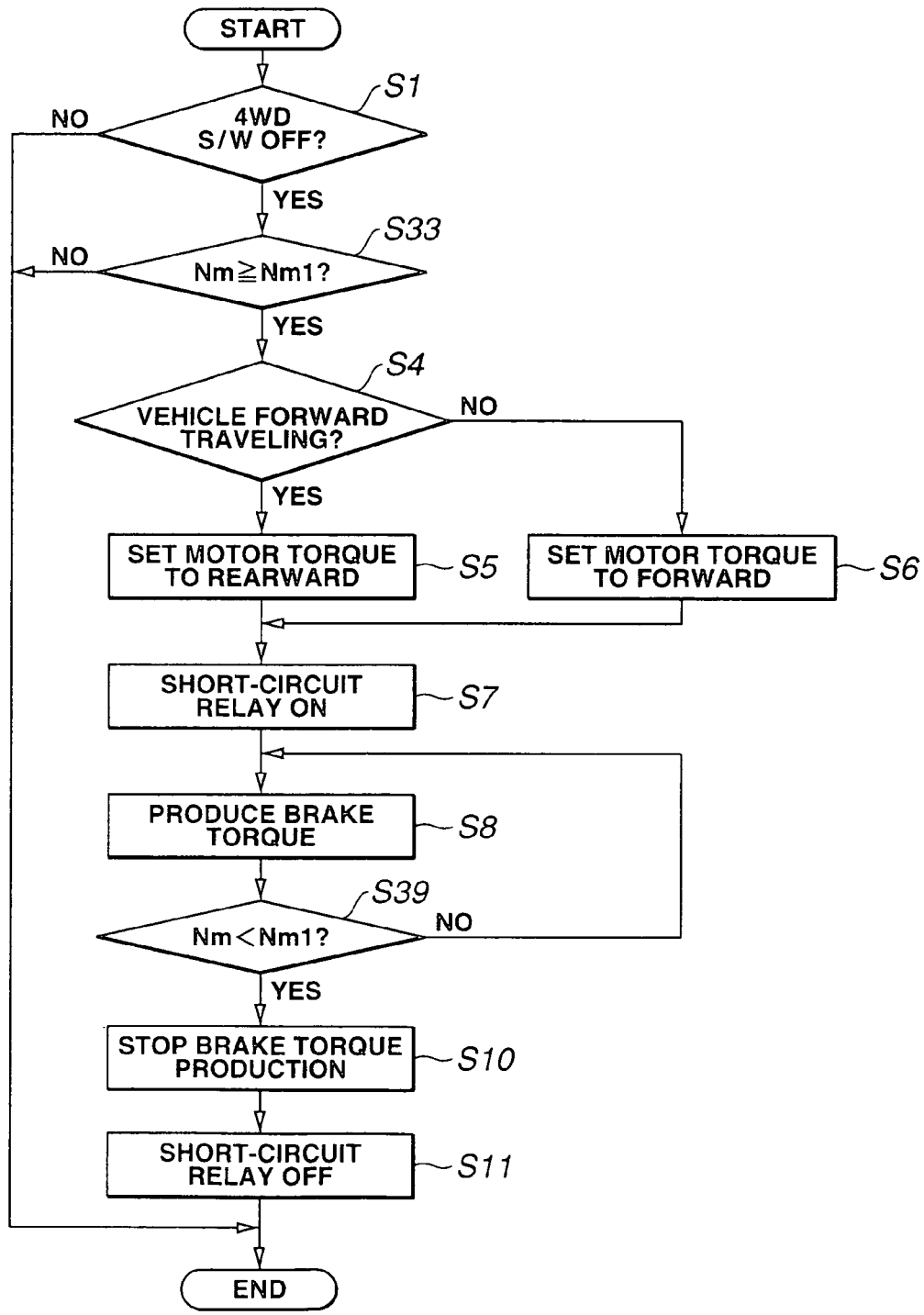
FIG. 4 is a flowchart of a reverse torque control routine implemented in a third embodiment of the drive control apparatus of the present invention.

Referring to FIG. 4, a flow of a reverse torque control routine implemented by 4WD controller 11 in a third embodiment of the present invention is explained. The third embodiment differs from the first embodiment in that 4WD controller 11 determines that electric motor 3 undergoes the drag motion when clutch 9 is in a disengaged state and rotation speed Nm of electric motor 3 is not less than predetermined value Nm1. Namely, the third embodiment is the same as the first embodiment except that step S2 as shown in FIG. 2 of the first embodiment is omitted, and steps S33 and S39 as shown in FIG. 4 are used instead of steps S3 and S9 as shown in FIG. 2. Like reference numerals denote like steps, and therefore, detailed explanations therefor are omitted.

As illustrated in FIG. 4, in step S33, 4WD controller 11 determines whether or not rotation speed Nm of electric motor 3 is not less than predetermined value Nm1. In this embodiment, the predetermined value Nm1 is a burst-resisting rotation speed capable of preventing occurrence of burst in electric motor 3. The predetermined value Nm1 may be set depending on a construction of electric motor 3. In step S33, when rotation speed Nm of electric motor 3 is less than predetermined value Nm1, it is determined that electric motor 3 is free from the drag motion due to idle torque of clutch 9. Then, the process is ended. In step S33, when rotation speed Nm of electric motor 3 is predetermined value Nm1 or more, it is determined that electric motor 3 undergoes the drag motion due to idle torque of clutch 9, and then, the process proceeds to step S4.

In step S39, 4WD controller 11 determines whether or not rotation speed Nm of electric motor 3 is dropped to predetermined value Nm1. In step S39, when rotation speed Nm is predetermined value Nm1 or more, it is determined that the drag motion of electric motor 3 still continues. Then, the process returns to step S8. In step S39, when rotation speed Nm is less than predetermined value Nm1, it is determined that electric motor 3 is free from the drag motion. Then, the process proceeds to step S10. Steps S1 and S33 constitute the drag motion detection section of 4WD controller 11, and steps S4 to S8, S39, S10 and S11 constitute the reverse torque control section thereof.

In the third embodiment as described above, detection of the drag motion of electric motor 3 can be ensured by comparing rotation speed Nm of electric motor 3 with predetermined value Nm1. Further, electric motor 3 can be surely prevented from suffering from excessive rotation or overheating by setting predetermined value Nm1 to a suitable value in view of mechanical durability of electric motor 3. The third embodiment can also attain the same effects as those of the first embodiment. The third embodiment based on the rotation speed of electric motor 3 is a modification of the first embodiment based on the rotation acceleration of electric motor 3. Meanwhile, the third embodiment may be combined with the second embodiment based on the accelerator opening degree.

Figure 5:
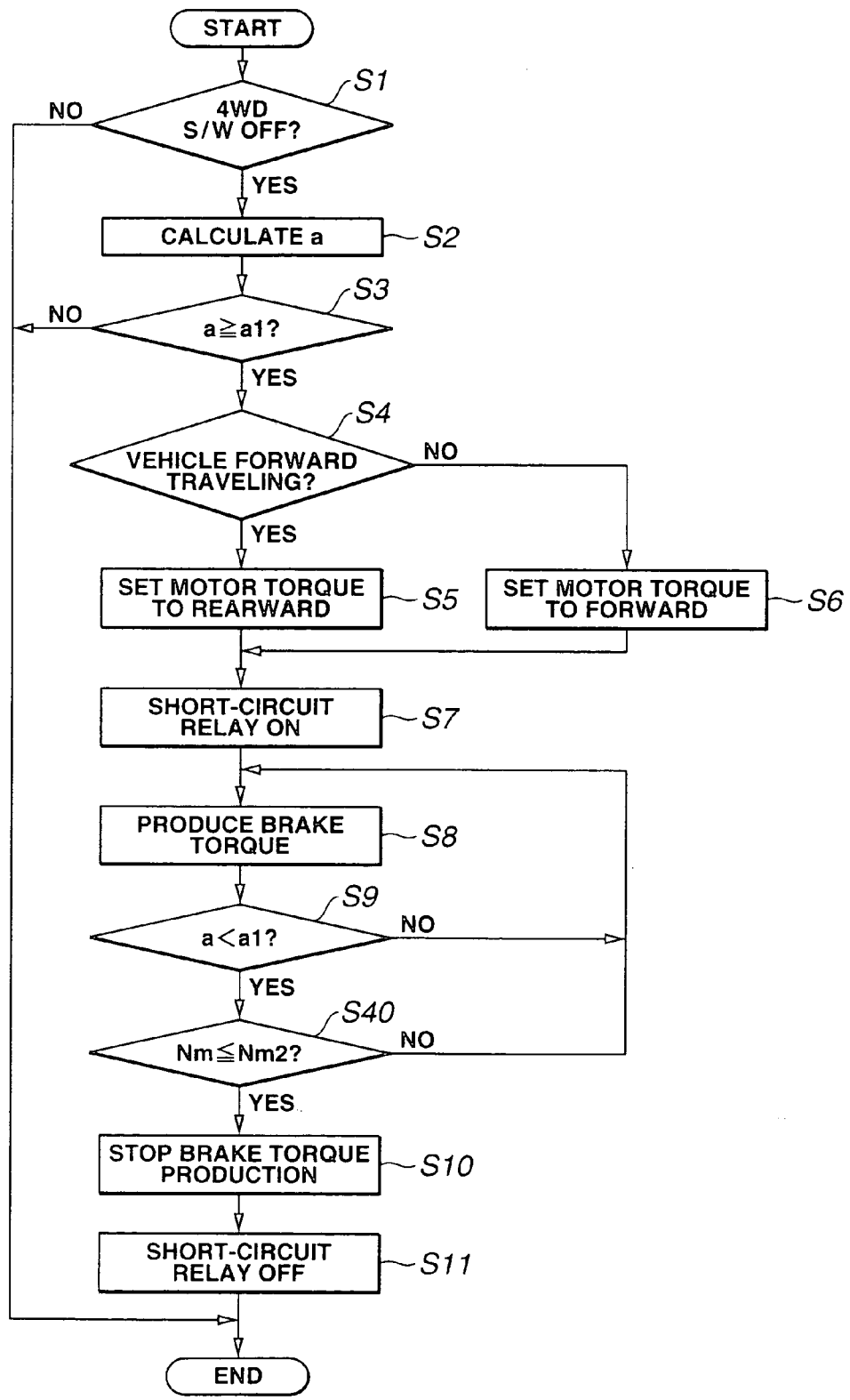
FIG. 5 is a flowchart of a reverse torque control routine implemented in a fourth embodiment of the drive control apparatus of the present invention.

Referring to FIG. 5, a flow of a reverse torque control routine implemented by 4WD controller 11 in a fourth embodiment of the present invention is explained. In the fourth embodiment, torque of electric motor 3 is controlled in a direction reverse to a direction of the drag motion of electric motor 3 until rotation speed Nm of electric motor 3 becomes to predetermined value Nm2 or less. Namely, the fourth embodiment is the same as the first embodiment except that step S40 as shown in FIG. 5 is executed before step S10 as shown in FIG. 2 of the first embodiment. Like reference numerals denote like steps, and therefore, detailed explanations therefor are omitted.

As illustrated in FIG. 5, in step S40, 4WD controller 11 determines whether or not rotation speed Nm of electric motor 3 is not more than predetermined value Nm2. In this embodiment, predetermined value Nm2 is a rotation speed allowing continuous rotation of electric motor 3. Predetermined value Nm2 may be set to a desired value in view of wear resistance of motor parts such as bearing and brush. For example, predetermined value Nm2 may be set to about 0. In step S40, when rotation speed Nm of electric motor 3 is more than predetermined value Nm2, it is determined that electric motor 3 still undergoes the drag motion due to idle torque of clutch 9. Then, the process returns to step S8. In step S40, when rotation speed Nm of electric motor 3 is predetermined value Nm2 or less, it is determined that electric motor 3 is free from the drag motion, and then, the process proceeds to step S10. Steps S1 to S3 constitute the drag motion detection section of 4WD controller 11, and steps S4 to S9, S40, S10 and S11 constitute the reverse torque control section thereof.

In the fourth embodiment as described above, rotation speed Nm of the drag motion of electric motor 3 can be surely reduced to predetermined value Nm2 by controlling the torque of electric motor 3 in the direction reverse to the direction of the drag motion of electric motor 3 until rotation speed Nm is dropped to predetermined value Nm2 or less. If predetermined value Nm2 is set to approximately 0, the drag motion of electric motor 3 can be substantially eliminated. The fourth embodiment can not only attain the same effects as those of the first embodiment, but also allow electric motor 3 to be substantially completely free from the drag motion. Meanwhile, in the fourth embodiment, although step S40 is added to the process of the first embodiment, the step corresponding to step S40 may be combined with the respective processes of the second embodiment and the third embodiment.

This application is based on prior Japanese Patent Application No. 2004-186326 filed on Jun. 24, 2004. The entire contents of the Japanese Patent Application No. 2004-186326 are hereby incorporated by reference.

Although the invention has been described above by reference to certain embodiments of the invention, the invention is not limited to the embodiments described above. Modifications and variations of the embodiment described above will occur to those skilled in the art in light of the above teachings. The scope of the invention is defined with reference to the following claims.

What is claimed is:

1. A drive control apparatus for a vehicle having an internal combustion engine driving main drive wheels, an electric motor driving auxiliary drive wheels, and a clutch disposed between the electric motor and the auxiliary drive wheels, the drive control apparatus comprising:
   a drag motion detection section configured to detect that the electric motor undergoes a drag motion due to idle torque of the clutch; and
   a reverse torque control section configured to control torque of the electric motor in a direction reverse to a direction of the drag motion of the electric motor when the drag motion of the electric motor is detected by the drag motion detection section.

2. The drive control apparatus as claimed in claim 1, wherein the drag motion detection section is configured to detect the drag motion of the electric motor when the clutch is in a disengaged state and a rotation acceleration of the electric motor is not less than a predetermined value.

3. The drive control apparatus as claimed in claim 1, wherein the drag motion detection section is configured to detect the drag motion of the electric motor when the clutch is in a disengaged state and an increment in accelerator opening degree is not less than a predetermined value.

4. The drive control apparatus as claimed in claim 1, wherein the drag motion detection section is configured to detect the drag motion of the electric motor when the clutch is in a disengaged state and a rotation speed of the electric motor is not less than a first predetermined value.

5. The drive control apparatus as claimed in claim 1, wherein the reverse torque control section is configured to control the torque of the electric motor in the direction reverse to a direction of the drag motion of the electric motor until a rotation speed of the electric motor becomes not more than a second predetermined value.

6. The drive control apparatus as claimed in claim 1, wherein the reverse torque control section is configured to determine the direction of the drag motion of the electric motor.

7. The drive control apparatus as claimed in claim 1, wherein the reverse torque control section is configured to set the direction of a motor torque to be produced in the electric motor.

8. The drive control apparatus as claimed in claim 1, wherein the reverse torque control section is configured to determine that a rotation acceleration of the electric motor is reduced to less than a predetermined value.

9. The drive control apparatus as claimed in claim 1, wherein the reverse torque control section is configured to determine that an increment in accelerator opening degree is reduced to less than a predetermined value.

10. The drive control apparatus as claimed in claim 1, wherein the reverse torque control section is configured to determine that a rotation speed of the electric motor is reduced to less than a first predetermined value.

11. The drive control apparatus as claimed in claim 1, wherein the reverse torque control section is configured to determine that a rotation speed of the electric motor becomes not more than a second predetermined value.

12. A drive control apparatus for a vehicle having an internal combustion engine driving main drive wheels, an electric motor driving auxiliary drive wheels, and a clutch disposed between the electric motor and the auxiliary drive wheels, the drive control apparatus comprising:
  a drag motion detection means for detecting that the electric motor undergoes a drag motion due to idle torque of the clutch; and
  a reverse torque control means for controlling torque of the electric motor in a direction reverse to a direction of the drag motion of the electric motor when the drag motion of the electric motor is detected by the drag motion detection means.

13. A method for controlling a vehicle having an internal combustion engine driving main drive wheels, an electric motor driving auxiliary drive wheels, and a clutch disposed between the electric motor and the auxiliary drive wheels, the method comprising:
  detecting that the electric motor undergoes a drag motion due to idle torque of the clutch; and
  controlling torque of the electric motor in a direction reverse to a direction of the drag motion of the electric motor when the drag motion of the electric motor is detected.

14. The method as claimed in claim 13, wherein the detecting operation comprises determining that the clutch is in a disengaged state.

15. The method as claimed in claim 13, wherein the detecting operation further comprises comparing a rotation acceleration of the electric motor with a predetermined value.

16. The method as claimed in claim 13, wherein the detecting operation further comprises comparing an increment in accelerator opening degree is not less than a predetermined value.

17. The method as claimed in claim 13, wherein the detecting operation further comprises comparing a rotation speed of the electric motor is not less than a first predetermined value.

18. The method as claimed in claim 13, wherein the controlling operation comprises determining the direction of the drag motion of the electric motor.

19. The method as claimed in claim 13, wherein the controlling operation further comprises setting the direction of a motor torque to be produced in the electric motor.

20. The method as claimed in claim 13, wherein the controlling operation further comprises determining that a rotation acceleration of the electric motor is reduced to less than a predetermined value.

21. The method as claimed in claim 13, wherein the controlling operation further comprises determining that an increment in accelerator opening degree is reduced to less than a predetermined value.

22. The method as claimed in claim 13, wherein the controlling operation further comprises determining that a rotation speed of the electric motor is reduced to less than a first predetermined value.

23. The method as claimed in claim 13, wherein the controlling operation further comprises determining that a rotation speed of the electric motor becomes not more than a second predetermined value.

* * * * *